June 25, 1929.    B. STANTON    1,718,442
FLOUR AERATOR AND SEPARATOR
Filed Nov. 9, 1925
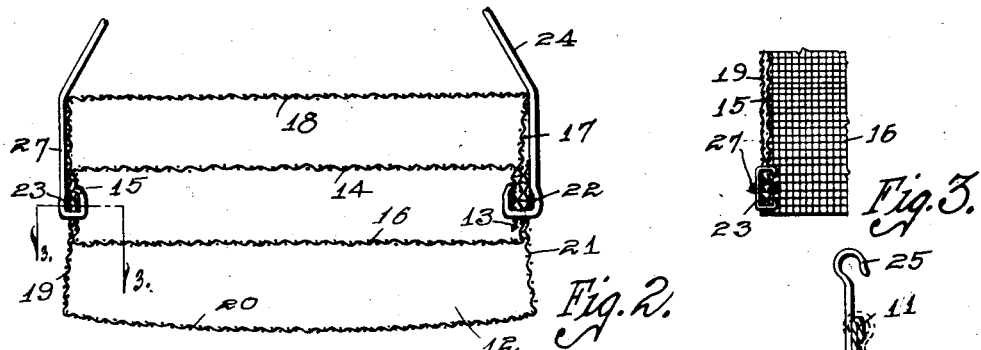
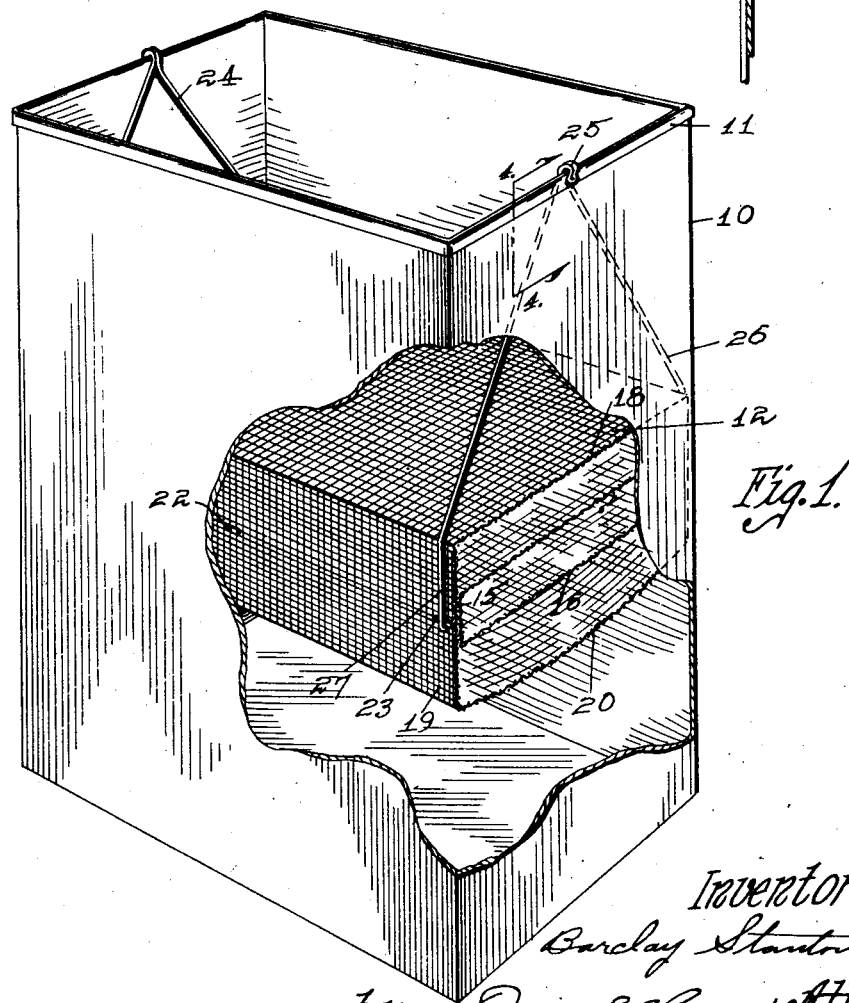

Patented June 25, 1929.

1,718,442

UNITED STATES PATENT OFFICE.

BARCLAY STANTON, OF DES MOINES, IOWA.

FLOUR AERATOR AND SEPARATOR.

Application filed November 9, 1925. Serial No. 67,853.

The object of my invention is to provide a flour aerator and separator of simple, durable and inexpensive construction, so constructed and arranged that flour may be easily and quickly sifted to separate its particles and mix it with air.

More specifically it is the object of my invention to provide an improved separating or sifting element which may be easily and quickly attached to or removed from the container, the separating element being formed of a single piece of wire cloth.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of my improved device, a portion of the casing being broken away to show the interior construction.

Figure 2 is an enlarged detail transverse sectional view of the separating or sifting element.

Figure 3 is an enlarged detail sectional view taken on the line 3—3 of Figure 2.

Figure 4 is a detail sectional view taken on the line 4—4 of Figure 1.

My improved device comprises a rectangular container 10 open at its upper end and formed of tinned sheet metal. The upper edge of each of the side and end members is folded outwardly and downwardly to provide a reinforcing rib 11, and also to form one member of the locking device hereinafter described.

The separating element 12 is formed of a rectangular piece of wire cloth folded in such a manner as to form four screens one above the other, said screens being arranged horizontally within the container and of such dimensions as to fit its interior surface. The separating element is formed of a single rectangular piece of wire cloth and provided with an upwardly extending portion 13, then a horizontally extending portion 14, a downwardly extending portion 15, a second horizontally extending portion 16 which is folded beneath the portion 14, then provided with an upwardly extending portion 17, a horizontally extending portion 18 above the member 14, a downwardly extending portion 19, a horizontally extending portion 20 beneath the member 16, the member 20 bulging downwardly at its center, and an upwardly extending portion 21 overlapping the members 13 and 17, as clearly shown in Figure 2. The members 13, 17 and 21 are secured together by means of suitable staples 22. The members 15 and 19 are also secured together by similar staples 23. The said member 12 is supported about midway between the top and bottom of said container by means of hangers 24, each of which is formed of wire having a hook portion 25 and diverging members 26. The lower end of each of the members 26 is provided with a downwardly extending portion 27 designed to pass between the side members of the separator 12 and the inside walls of the container. The lower ends of said members 27 are bent inwardly and upwardly and extended through the members 19 and 15 at one side and the members 13, 17 and 21 at the other side of the said separator. The inner ends of said inwardly projecting portions are bent upwardly to form hooks for supporting the separator, the said hook portions being designed to surround the staples 22 and 23, thereby providing means for reinforcing the connection between the hook portion and the separating portion. The lower ends of the members 19 and 22 are flared outwardly a slight distance so that the lower ends of said members will form a tight joint with the inside surface of the container, as a space would otherwise be provided on account of the wires 27.

The hook members 25 are designed to rest on the upper edges of the members 11 and are so formed that the lower end of the members 25 will engage the lower edge of the member 11 in a yieldable manner, as clearly shown by dotted lines in Figure 4, so that the hangers are supported against upward movement or against downward movement when the container is placed in an inverted position.

The device is operated by simply placing the flour or other material to be aerated and separated into the container above the separator, then grasping the rectangular casing between the thumb and fingers and producing a lateral, quick oscillating movement, which will cause the material to be sifted through the four screens and to enter the lower end of the container, after which the container may be inverted and the sifting action repeated, which will cause the material to be sifted eight times and to be reduced to a light and aerated condition.

In this connection it should be noted that when the flour or other material has been sifted through the screens into the bottom of the container and the container has been inverted, the flour will rest on top of the bulged portion of the member 20, which is at this time arched upwardly. The weight of the flour on the bulged portion will have a tendency to straighten out the bulged portion and to force the ends of the member 20 adjacent to the sides of the container, and thereby close the space between the end of the member 20 and the said container.

By this arrangement it will be seen that I have provided a separator and aerator device of simple, durable and inexpensive construction, which will sift the flour and mix any ingredients that might be placed therein quickly and easily.

It will further be seen that I have provided a separating element which may be easily and quickly formed from a single piece of wire cloth without the use of any binders or similar reinforcing devices, with the exception of the staples which hold the overlapping members together. I have experimented with numerous ways of forming this element by making each screen of a separate piece, and found considerable difficulty in devising a suitable screen which could be made cheap enough to make the device a commercial success, until I devised the arrangement disclosed herein, which I find can be easily and quickly made and practical in all respects, and which may be easily and quickly attached to or removed from the container.

I claim as my invention:

1. In a device of the class described, a separator element comprising a series of horizontally arranged and spaced screen members, and side members formed of screen material having overlapping edges, staples for securing said overlapping edges together, and hangers for supporting said separator element formed of wire having their ends hooked into said side members at points adjacent to and beneath said staples, whereby the side members will be reinforced by said staples at the point of connection between the hanger and said element.

2. In a device of the class described, a container open at one end, a removable separator element formed of a single piece of material comprising a number of spaced and horizontal screen members, said horizontal members being supported at their side edges by overlapping vertical portions, staples for securing the overlapping vertical portions together, and a pair of hangers for said separating element having hook portions entering the overlapping portions of said side members and adjacent to and beneath said staples.

3. In a device of the class described, a container open at one end, a separator element supported substantially midway between the bottom and top ends of said container, said element comprising a number of spaced and horizontal screen elements supported at their side edges by the overlapping vertical portions of said screen elements, and hangers supported between said screen elements and said container and attached to said vertical elements between their upper and lower edges, the lower ends of said vertical elements bending outwardly to engage the side members of said container, the bottom one of said horizontal members being bulged downwardly when the container is in an upright position.

Des Moines, Iowa, October 15, 1925.

BARCLAY STANTON